United States Patent [19]
Hagen

[11] Patent Number: 5,638,234
[45] Date of Patent: Jun. 10, 1997

[54] FLEXURE WITH REDUCED UNLOADED HEIGHT FOR HARD DISC DRIVE HEADS

[75] Inventor: Tracy M. Hagen, Edina, Calif.

[73] Assignee: Seagate Technology, Inc., Scotts Valley, Calif.

[21] Appl. No.: 432,843

[22] Filed: May 2, 1995

Related U.S. Application Data

[63] Continuation-in-part of Ser. No. 975,352, Nov. 12, 1992.

[51] Int. Cl.⁶ ........................................................ G11B 5/48
[52] U.S. Cl. ............................................................. 360/104
[58] Field of Search ........................................ 360/103, 104

[56] References Cited

U.S. PATENT DOCUMENTS

| | | | |
|---|---|---|---|
| H1424 | 4/1995 | Budde | 360/104 |
| 4,876,623 | 10/1989 | Takekado | 360/104 |
| 5,019,931 | 5/1991 | Ohwe et al. | 360/104 |
| 5,079,660 | 1/1992 | Yumura et al. | 360/104 |
| 5,198,945 | 3/1993 | Bleaser et al. | 360/104 |
| 5,282,103 | 1/1994 | Hatch et al. | 360/104 |
| 5,353,181 | 10/1994 | Frater et al. | 360/104 |
| 5,386,331 | 1/1995 | Wolter | 360/104 |
| 5,428,490 | 6/1995 | Hagen | 360/104 |
| 5,504,640 | 4/1996 | Hagen | 360/104 |

*Primary Examiner*—Stuart S. Levy
*Assistant Examiner*—Brian E. Miller
*Attorney, Agent, or Firm*—Westman, Champlin & Kelly, P.A.

[57] ABSTRACT

A flexure for mounting a head in a hard disc drive. The gimbal of the flexure includes a load point tab which retains the full thickness of the original flexure material for most of its area and further includes a thinned area local to and surrounding a desired location for a load point button. The thinned area is formed out-of-plane from the remainder of the flexure by approximately one-half the material thickness. The size of the thinned area is selected to be such that the thinned area is substantially non-compliant under intended load forces.

18 Claims, 8 Drawing Sheets

FLEXURE WITH REDUCED UNLOADED HEIGHT FOR HARD DISC DRIVE HEADS

RELATED APPLICATION

This application is a continuation-in-part of U.S. patent application No. 07/975,352, filed Nov. 12, 1992, assigned to the assignee of the present invention.

BACKGROUND OF THE INVENTION

1. Field of the Invention

This invention relates generally to the field of hard disc drives, and more particularly, but not by way of limitation, to a flexure for supporting a head in a disc drive, the flexure having a reduced unloaded height.

2. Brief Description of the Prior Art

Disc drives of the type known as "Winchester" disc drives are well known in the industry. Such disc drive data storage devices typically contain a stack of rigid discs coated with a magnetic medium on which digital information is stored in a plurality of circular concentric tracks. The storage and retrieval of data—also called "writing" and "reading", respectively—is accomplished by an array of heads, usually one per disc surface, which are mounted on an actuator mechanism for movement from track to track. The most common form of actuator used in the current generation of disc drive products is the rotary voice coil actuator, which uses a voice coil motor (VCM) coupled via a pivot mechanism to the heads to access data on the disc surfaces. The structure which supports the heads for this movement is referred to as a head/gimbal assembly, or HGA.

The HGA in a typical disc drive consists of three major components:

1. a slider, which features a self-acting hydrodynamic air bearing and an electromagnetic transducer for recording and retrieving information on a spinning magnetic disc. Electrical signals are sent to and received from the transducer via very small twisted copper wires;

2. a gimbal, which is attached to the slider and is compliant in the slider's pitch and roll axes for the slider to follow the topology of the disc, and is rigid in the yaw and in-plane axes for maintaining precise slider positioning, and;

3. a load beam, which is attached to the gimbal and to a mounting arm which attaches the entire assembly to the actuator. The load beam is compliant in the vertical axis to, again, allow the slider to follow the topology of the disc, and is rigid in the in-plane axes for precise slider positioning. The load beam also supplies a downward force that counteracts the hydrodynamic lifting force developed by the slider's air bearing.

Since the introduction of the first Winchester disc drive, the physical size of the slider has been progressively reduced, first from the original Winchester head to the so-called "mini-Winchester", and more recently to the 70 and 50 Series heads, which are 70% and 50% the size, respectively, of the mini-Winchester slider. While these size reductions are significant, the overall vertical dimension of the HGA has been dictated more by the slider-supporting mechanism than by the size of the slider itself.

The load beam and gimbal comprise an assembly generally known as a head suspension, head flexure, or simply a flexure. An example of such a flexure is described in U.S. Pat. No. 4,167,765.

Historically, the gimbal and load beam are fabricated discretely. The gimbal and load beam pieces are realized by chemically etching 300 series stainless steel foil into the desired shape, and then the two pieces are attached by means of laser welding.

The general technology trend in disc drive data storage devices is continual shrinking of the physical size of the product while providing increased data storage capacity. The down-sizing of the product has required smaller components, especially the principal components such as discs, sliders and flexures. Additionally, disc drive designers seek to add capacity to their designs by incorporating as many discs as possible within defined package dimensions. As the number of discs in the unit increases, the spacing between the discs decreases, thus further driving the need for smaller sliders and flexures.

Another industry trend is to provide the user of disc drives with high data storage capacity at low cost. This requires developing improved data recording technology and finding lower cost ways of manufacturing the components of the disc drive.

The use of discrete gimbal and load beam components laser welded together, as shown in the '765 patent, has become problematic in disc drives of the current 2.5", 1.8" and 1.3" generations of disc drives. In such units, the flexures must become thinner in order to allow desirable close spacing of the discs, while the overlapping required to laser weld two discrete components dictates a certain minimum height for the flexure.

Furthermore, the use of thinner gimbal and load beam components increases the likelihood of residual stress caused by the laser welding of the two components together. It has been found that laser welding produces residual tensile stress in the material local to the welds. This causes the flexure to distort. In the longitudinal direction, the flexure curls from the residual weld stress, and this makes it more difficult to fit the flexure between closely spaced discs during the manufacturing process. Further, if the welds are not placed symmetrically about the longitudinal centerline of the flexure, the residual weld stress will cause a torsional distortion, or twisting, of the flexure. Such an flexure is undesirable since the twist will create a moment, or torque, on the slider's air bearing, causing unwanted changes in the flying attitude of the head, and potentially rendering the assembly unusable.

The welding process is also a substantial portion of the labor that goes into the manufacture of a flexure, and it would, thus, be advantageous to eliminate the practice of making discrete gimbals and load beams and welding the two together for cost reduction.

Since the gimbal and load beam components must overlap in flexures of existing art, the emphasis on reducing the thickness of the flexure assembly has most often focused on reducing the thickness of the individual gimbal and load beam components. The thickest area of the load beam is the region known as the rigid beam, which usually features flanges along the outer edge along the longitudinal axis of the flexure. U.S. Pat. No. 4,996,616 teaches how a pair of drawn ribs can provide reinforcement of the rigid beam section of the flexure. Unfortunately, the drawn pair of ribs of '616 requires that the flexure material be strained to exceedingly high levels. Such stain can introduce cracks in the drawn material, and high stresses in the material near the ribs.

Various attempts have been made to solve the problems inherent in welding a gimbal and load beam together by devising a flexure in which the gimbal and load beam are formed from a single piece of material and would thus require no welding. An example of such an integrated gimbal and load beam is presented in U.S. Pat. No. 4,245,267. A second example is known as the HTI Type 16, or T16, manufactured by Hutchinson Technology, Incorporated. Both of these flexures have a gimbal incorporated into the load beam and, of course, no gimbal-to-load beam welds. Both include a bonding surface on which adhesive is placed to secure attachment of the slider to the flexure. A plurality of beams, etched into the load beam, connects this bonding surface to the load beam portion of the flexure and provides the desired gimbal characteristics.

One failing of the flexure of the '267 patent and the T16 flexure relates to an element of flexure design commonly referred to as "load point". Simply stated, load point refers to the single point of contact where the downward force of the load beam is applied to the slider. Proper selection of this load point ensures that the forces related to the hydrodynamic air bearing of the slider are properly balanced. In prior art flexures such as the one described in the '765 patent, load point is developed by forming an upward-extending dimple in the gimbal bonding surface. The load beam contacts the spherical surface of this dimple at a single point to allow proper gimbal action. In the case of the '267 and T16 flexures, however, a well defined load point is not provided, and, thus, an undesirably wide range of variation in slider flying characteristics is associated with these types of flexure.

A second fundamental problem with the '267 and T16 types of flexures is that the downward force of the load beam is applied to the slider by placing the gimbal beams into bending mode, and the gimbal beams must therefore be stiff in bending mode. These same gimbal beams, however, must be compliant in bending mode to allow the proper gimballing action. This conflicting requirement results in designs that either work poorly as a gimbal or become deformed under load.

A third problem with the '267 and T16 flexures is that the slider bonding surface, in general, covers a large area over the center of the slider. The slider is attached to the flexure with an adhesive epoxy, and, in order to reduce the cure time of the adhesive, the assembly is usually heated in an oven. Since the slider and flexure are made of dissimilar materials with different coefficients of linear thermal expansion, thermally induced strains develop at the bond when the assembly cools. These strains can distort the slider and undesirably change the flatness of the air bearing surface of the slider, thus, once again, introducing unacceptably wide variation into the flying characteristics of the heads.

Two examples of a unitary, or one-piece, flexure which overcomes these deficiencies are described in co-pending U.S. patent applications No. 07/975,352, of which this application is a continuation-in-part, and No. 07/976,163, now U.S. Pat. No. 5,331,489, issued Jul. 19, 1994, both filed Nov. 12, 1992, both assigned to the assignee of the present invention and the latter of which is incorporated herein by reference.

The flexures of the above-cited references are manufactured from a single piece of fully hardened 300 series stainless steel using the processes of through-etching and half-etching. That is, the overall outline and through openings are created by through-etching, while certain features are formed with a reduced material thickness brought about by the process of half-etching.

In typical chemical through-etching processes, the material to be etched is first coated on both sides with a material called resist. The resist is patterned using a stencil and exposing the resist to a light source. Unexposed resist is then stripped away, leaving exposed metal that will be etched away in the presence of an acid-like etchant, while those areas of the material protected by the resist, or "mask", remain at their original thickness. Both sides of the material are treated in this manner, with the pattern on both sides being identical and very accurately aligned. By carefully controlling the strength of the etchant and the time of exposure of the material to the etchant, very precisely shaped and dimensioned parts can be realized.

In half-etching, the pattern of the stencil on one side of the material is dissimilar to that on the other side. This also is a well known technique for etching text, art or half-tone photographs into sheet metal. It is known that if the area to be half-etched is large—that is, it has a length or diameter many times that of the material thickness—then the depth of the half-etching will be approximately sixty percent that of the material thickness. That is, during the time of immersion in the etchant solution which will cause through-etching in those areas where the etchant-resistant mask is missing on both sides of the material, those areas of the material which are exposed only on one side will be etched to about forty percent of the original material thickness.

This half-etching process is used in the flexures disclosed in the cited references to reduce the thickness of a pair of gimbal beams which are compliant in the flexure's roll and pitch axes, and stiff in the yaw and in-plane axes.

Two tabs are also formed in the disclosed flexures, with the first tab left at the original material thickness and used to adhesively bond the slider to the flexure.

The second tab is used to support and mount the load point button which contacts the top of the slider and transfers the downward force of the flexure to the slider to counterbalance the hydrodynamic lifting force of the slider's air bearing. This load point tab is half-etched on the side toward the slider, except in that location selected for the load point, which retains the original material thickness. This is achieved by masking the location and shape of the desired load point button to prevent etching at that point, as described above.

Because of the relative thinness of the load point tab of the cited references, this tab must be pre-formed—that is, bent at a compensating angle—so that when the entire assembly is placed under the designed load in cooperative arrangement with the surface of a disc, the load point tab is brought back into parallel relationship to the gimbal beams and slider mounting tab. Such a head/flexure assembly has a very low "loaded" height.

It has been found, however, that the design of the flexures of the cited references introduces significant variability between individual units when produced in a high-volume manufacturing environment. Specifically, it is difficult to closely control the thickness of the load point tab as determined by the half-etching process, which leads to the necessity of varying the angle at which the load point tab is preformed to compensate for the variations in thickness.

Additionally, since the load point tab is pre-bent to compensate for load on the head, the unloaded height is necessarily increased, and it is this unloaded height of the head/flexure assembly which determines how much inter-disc spacing must be allowed for assembly of the disc drive.

A need clearly exists, therefore, for an improved slider-supporting flexure which reduces the overall unloaded vertical height of the HGA, as well as eliminates much of the individual variation between units, and which can be manufactured in a simple, cost-effective manner.

SUMMARY OF THE INVENTION

In the improved one-piece flexure assembly of the present invention, the majority of the load point tab is left at the full material thickness, while only a relatively small area local to the load point button is half-etched. This half-etched area, including the load point button, is then pressed or stamped in a secondary manufacturing step to form the load point button out of plane from the original material surface. In preferred embodiments, the amount of displacement of the half-etched area local to the load point button is equal to approximately one-half the original material thickness. The size of the half-etched area local to the load point is selected such that the half-etched area after forming is substantially non-compliant under intended load forces. The gimbal beams and slider mounting tab are created as in the first of the previously cited references.

It is an object of the invention to provide a flexure, for mounting a head in a hard disc drive, which has a reduced unloaded height.

It is another object of the invention to provide a flexure which is manufacturable with less unit-to-unit variation than in flexures of the prior art.

It is another object of the invention to provide a flexure which is simple and inexpensive to fabricate.

These and other objects and advantages of the present invention will become apparent in the following detailed description of the preferred embodiment, when read in conjunction with the accompanying drawings.

DETAILED DESCRIPTION OF THE PREFERRED EMBODIMENTS

Figure 1:
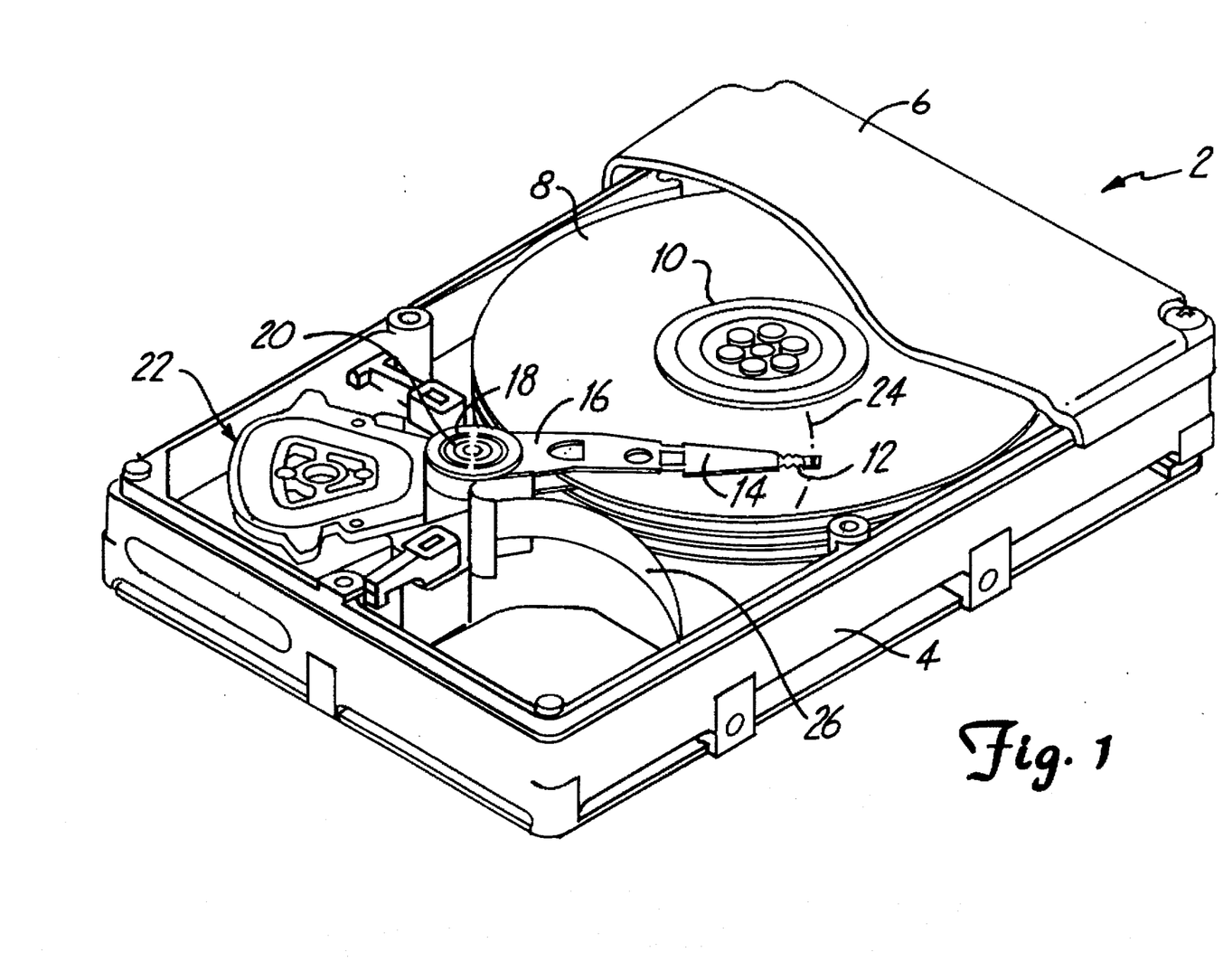
FIG. 1 is an isometric view in partial cutaway of a disc drive in which the present invention is particularly useful.

Turning now to the drawings and in particular to FIG. 1, shown is a disc drive 2 of the type in which the present invention is particularly useful. The disc drive 2 includes a base member 4 which, in cooperation with a top cover 6 (shown in partial cutaway), forms a sealed environment to protect the delicate internal components from outside contaminants. A number of rigid discs 8 coated with a magnetic medium are mounted for rotation on a spindle motor (shown generally at 10). The surfaces of the discs 8 hold a large number of concentric circular tracks to which information is written and from which information is read. The reading and writing of data is accomplished by a plurality of vertically aligned heads 12, mounted on flexures 14, which in turn are attached to a corresponding plurality of head mounting arms 16, which form part of an actuator body 18, adapted for rotation about a pivot shaft 20 by a voice coil motor (VCM), shown generally at 22. The VCM 22 thus controllably moves heads 12 along arcuate path 24 across the data tracks (not shown) Power for the VCM 22, as well as the signals used to read and write data, is passed via a printed circuit cable (PCC) 26.

Figure 2:
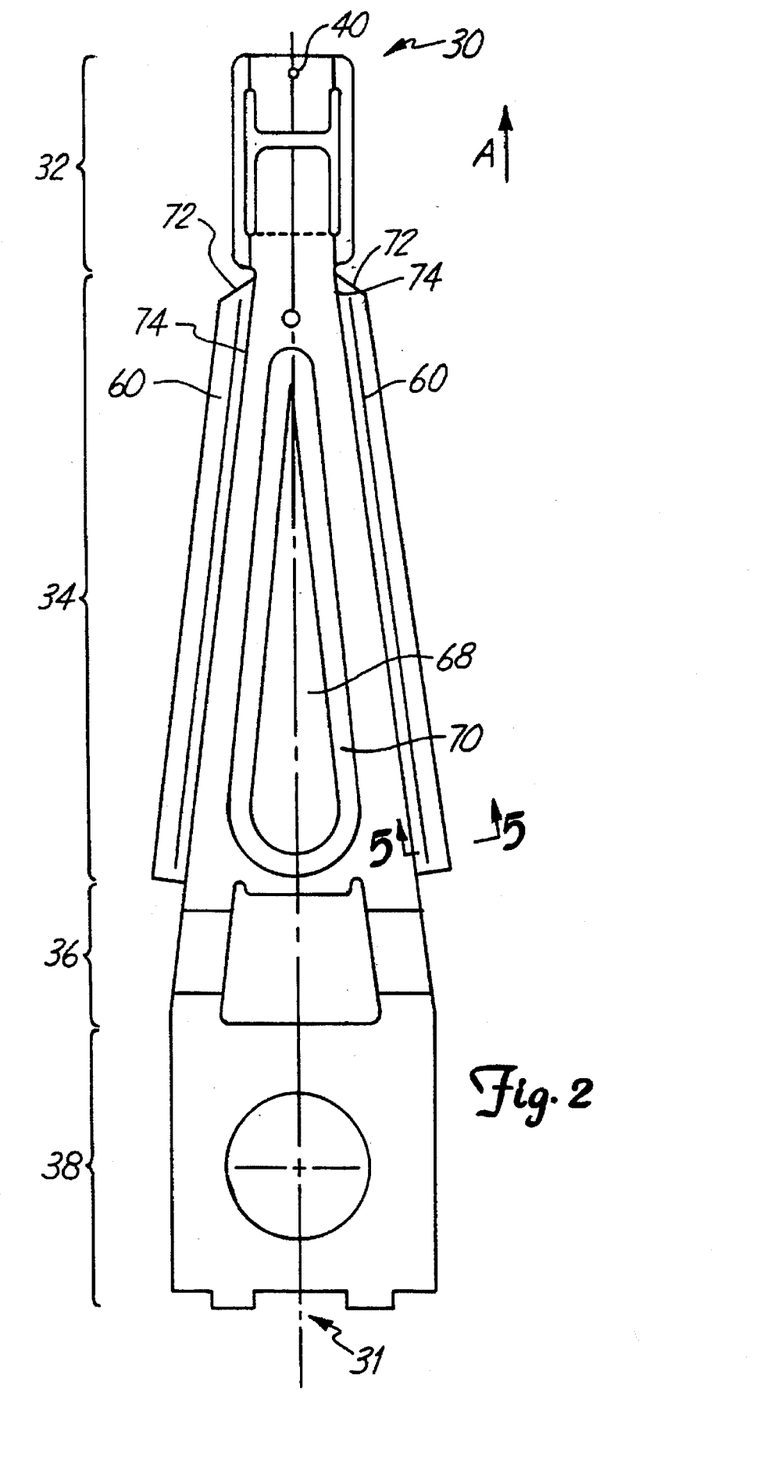
FIG. 2 is a plan view of a flexure made in accordance with the application of which this application is a continuation-in-part.

Turning now to FIG. 2, shown is a plan view of a flexure 30 made in accordance with the application of which this application is a continuation-in-part. The flexure 30 is substantially symmetrical about a longitudinal axis 31 and is made up of four distinct major areas:

1. a gimbal/slider mounting area 32;
 2. a rigid beam 34;
 3. a pair of compliant beams 36, and;
 4. an attachment surface 38.

The entire flexure 30 is formed from a single piece of 300 series full hard stainless steel, preferably 0.0025 inches in thickness, and manufactured using well known chemical etching processes.

A pair of alignment holes 40, 42 aid in fixturing the flexure during the process of bonding the slider (not shown).

The attachment surface 38 in the example of FIG. 2 is shaped to be attached to a particular type of mounting plate to provide a strong surface for attachment of the entire flexure head assembly to the head mounting arms 16 of the actuator body 18. While the specific method of mounting the flexure is not considered a part of this invention, it should be noted that this attachment surface 38 could easily be adapted for use with other types and designs of mounting apparatus, such as that described in U.S. Pat. No. 5,313,355, issued May 17, 1994.

The direction of movement of the disc relative to the flexure is shown by arrow A. Any slider attached to the flexure of the present invention is therefore assumed to have its leading edge closest to the attachment surface 38 and its trailing edge closest to the free end of the gimbal/slider mounting area 32.

Since the present invention relates to differences in the gimbal/slider mounting area 32, no further discussion will be made herein of the other portions of the flexure.

Figure 3:
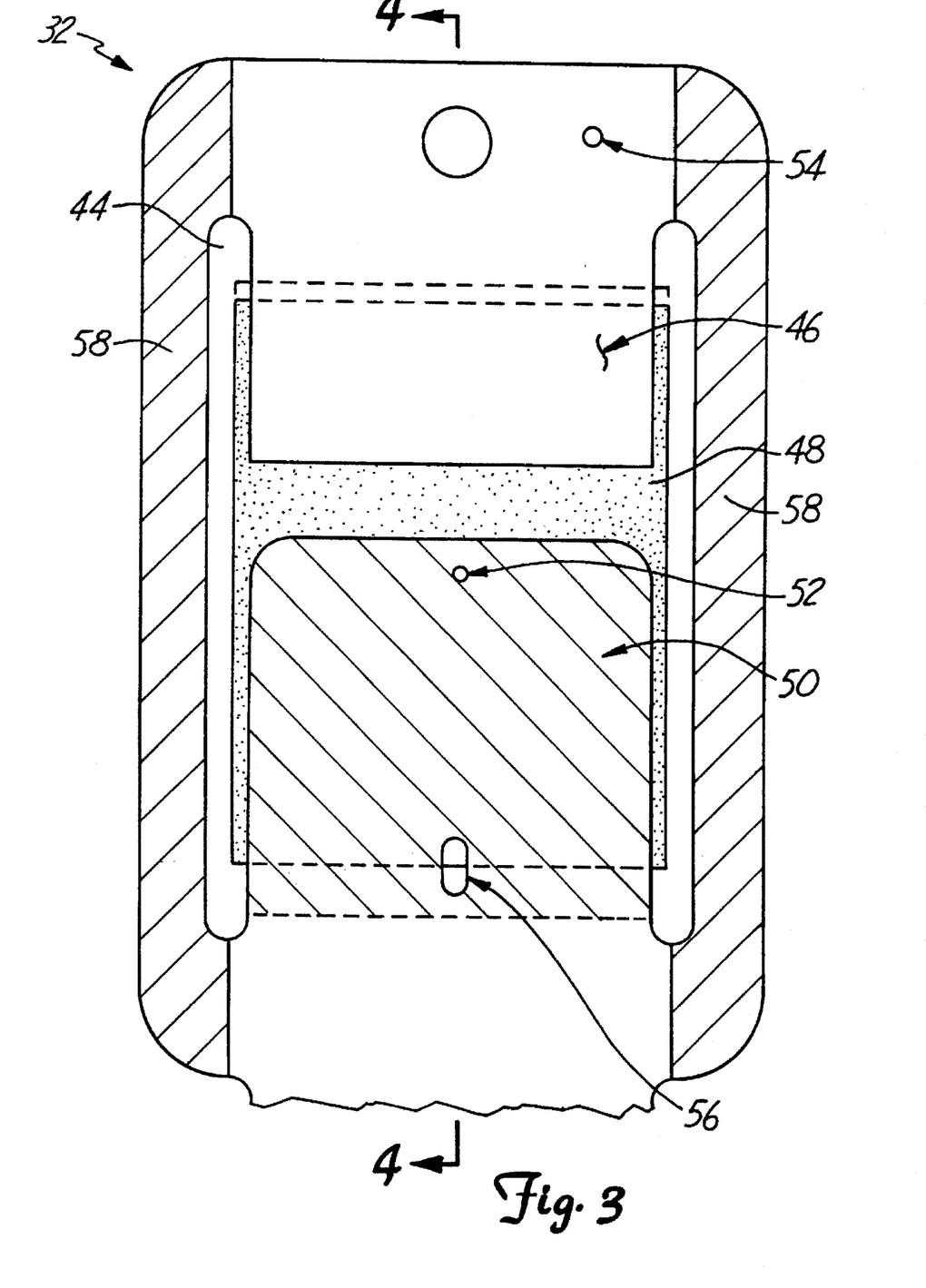
FIG. 3 is a detail plan view of the gimbal/slider mounting portion of the flexure of FIG. 2.

FIG. 3 shows a detailed view of the gimbal/slider mounting area 32 of the flexure of FIG. 2 with a slider 48 attached.

The process of through- and half-etching is used to produce several of the features of the flexure of both the previously cited references and the present invention. For instance, as can be seen in FIG. 3, an H-shaped opening 44 has been etched completely through the material, and areas beside the vertical legs and on one side of the cross member of the H-shaped opening 44 have been half-etched. Specifically, the area shaded lower-left-to-upper-right is half etched on the near side of the material, while the area shaded lower-right-to-upper-left has been half-etched on the far side of the material. Since the overall thickness of the material is approximately 0.0025 inches, these half-etched areas are reduced in thickness to about 0.0010 inches thick.

This half-etching process forms a pair of gimbal beams 58 and a slider mounting tab 46 to which the slider 48 is adhesively bonded. As can be seen in the figure, this bonding is thus done only in that area of the slider 48 closest to the trailing edge of the slider 48.

The H-shaped opening 44 also forms a load point tab 50 on the opposite side of the cross-member of the opening from the slider mounting tab 46. The load point tab 50 transmits the load force of the flexure to the slider 48 via a load point button 52, or load supporting protrusion, which is formed by masking the desired location and size prior to half-etching, so that the load point button 52 retains the full thickness of the flexure material. Since the majority of the load point tab 50 is half-etched on the far side of the material as viewed, this has the effect of creating a "pin" which projects toward and contacts the top of the slider 48. The load point button 52 should be as small in area as is possible given the manufacturer's capability in chemical etching. This dimension has been found currently to be about 0.002 inches, which causes the load force of the flexure to be applied to the slider at as close as possible to a single point. The location of this single point is selected to provide the desired flying characteristics for the particular design.

Since the entire load point tab 50 with the exception of the load point button 52 has been reduced in thickness by half-etching, it was necessary to pre-form the load point tab 50 to compensate for bending which would occur due to the "downward" force applied by the remainder of the flexure to the slider. A formula for calculating the proper amount of pre-forming was given in the first of the previously cited references, and the resulting structure is illustrated in FIG. 4, which is a side sectional view of the gimbal/slider mounting portion of the flexure of FIG. 2.

Figure 4:
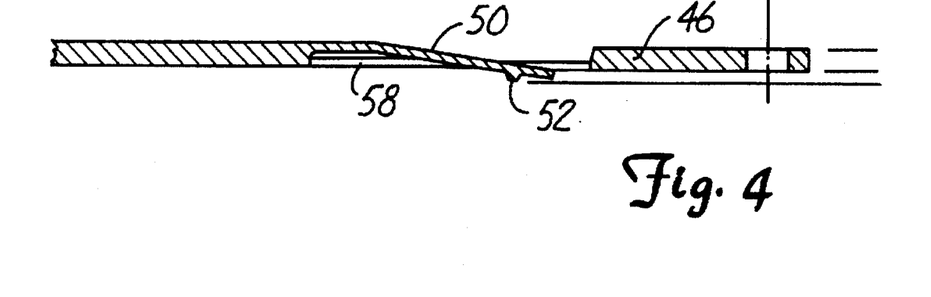
FIG. 4 is a side sectional view of the gimbal portion of the flexure of FIG. 2, shown in its unloaded condition.
Figure 5:
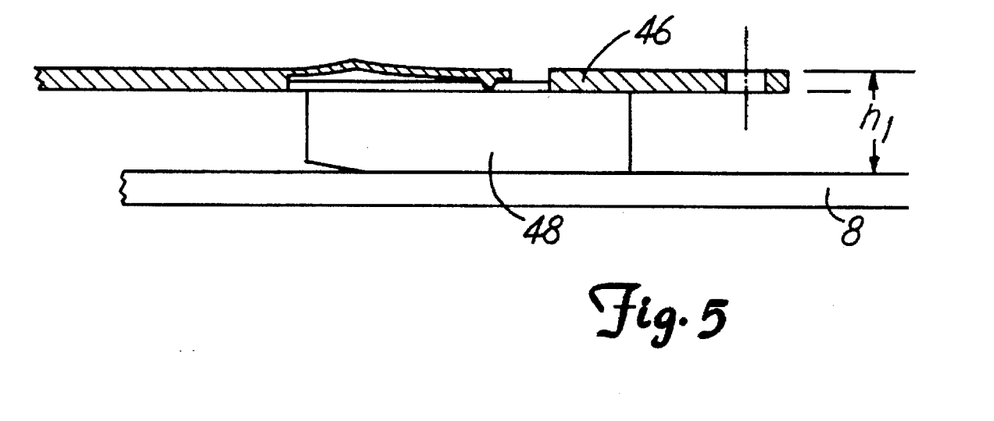
FIG. 5 is a side sectional view of the gimbal portion of the flexure of FIG. 2 as assembled to a slider and in cooperative relationship to a disc.

In FIG. 4, the desired forming of the load point tab 50 is illustrated by a detail sectional view taken along line 4—4 of FIG. 3. As can be seen, the load point tab 50 is bent in the direction of the slider (not shown) at an angle of approximately 3.546°, as calculated as an example in the first of the previously cited references. Because of this bending, when the slider is mounted on the slider mounting tab 46, and the entire assembly is brought into its intended relationship with the spinning disc of the disc drive, the bottom of the load point button 52—and thus the top surface of the slider—will lie substantially in the plane occupied by the gimbal beams 58. This relationship is best seen in FIG. 5, wherein a slider 48 has been bonded to the slider mounting tab 46 and the entire assembly brought into operational relationship to a disc 8. However, it must be recalled that this ideal relationship occurs only when the slider 48 of the assembly is in the intended cooperative relationship with the disc 8, or in the "loaded" condition.

Figure 6:
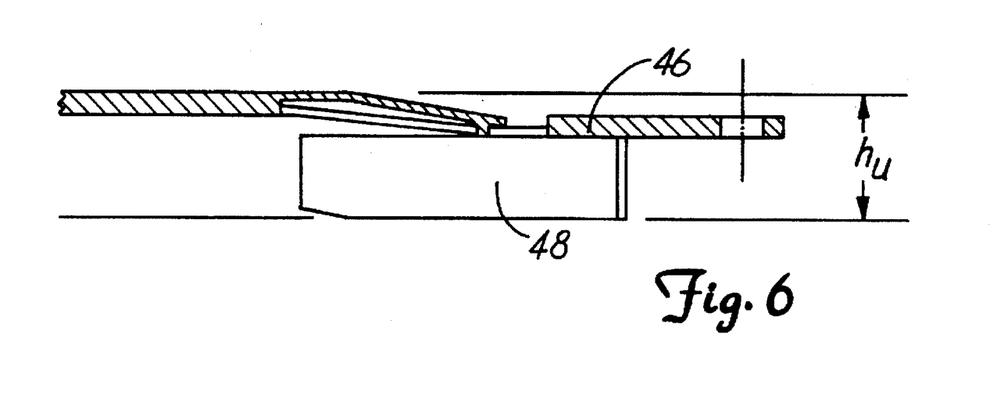
FIG. 6 is a detail sectional view of the flexure of FIGS. 2 through 5 with a slider attached and in an unloaded condition.

Referring now to FIG. 6, shown is the flexure assembly of FIGS. 2 through 5, with a slider 48 attached to the slider mounting tab 46. This assembly is shown in its unloaded condition, that is, as assembled, but not in its intended cooperative relationship to a disc.

As is readily apparent from the figure, this type of flexure forces the slider 48 to be displaced slightly "out of plane" with the intended loaded configuration shown in FIG. 5, and this displacement results in an unloaded height, designated $h_u$, which is significantly greater than the loaded height, designated $h_1$ in FIG. 5. Once again, it should be noted that it is this unloaded height, $h_u$, which determines how closely discs can be spaced in the disc drive, since, during the assembly process, a "comb" is usually inserted between the rigid beams of a stack of flexures to hold the heads in a separated condition, to allow the insertion of the heads over the discs. During this operation, no load is applied to the delicate gimbals and they are thus in the unloaded condition shown in FIG. 6.

This relatively large unloaded height, $h_u$, is the first of the drawbacks of the flexures of the previously cited references.

A second difficulty in implementing the configuration of the previously cited references was found to be unexpected variability in the thickness of the load point tongue after etching. The preferred embodiments of the previously cited references feature a load point tab with a nominal thickness of 0.0010 inches. It was found, however, that the half-etch manufacturing process could be expected to produce a standard deviation in this thickness of 0.0001 inches, or 10%. Equation (1) of the first of the previously cited references describes the relationship between load point tab thickness and deflection under load, with equation (3) of the reference illustrating the case of the preferred embodiment. Table 1 below shows the effect of this thickness variability on load point tab deflection, and thus on unloaded HGA height, over a ±3σ range.

As can be readily seen from the table, −3σ variation in the thickness of the load point tab results in an increase in load point tab deflection from 0.002066 inches at the nominal load point tab thickness of 0.0010 inches to 0.006023 inches at a load point tab thickness of 0.0007 inches, or an increase in deflection of 0.003957 inches. Such an increase causes the amount of necessary inter-disc spacing to be increased, thus limiting the design of the disc drive, while the variability evident in the table shows the difficulty of producing consistent results.

TABLE 1

| Load Point Tab Thickness | Load point Tab Deflection |
| --- | --- |
| 0.0007 inches (−3σ) | 0.006023 inches |
| 0.0008 inches (−2σ) | 0.004035 inches |
| 0.0009 inches (−1σ) | 0.002834 inches |
| 0.0010 inches (nominal) | 0.002066 inches |
| 0.0011 inches (+1σ) | 0.001552 inches |
| 0.0012 inches (+2σ) | 0.001195 inches |
| 0.0013 inches (+σ) | 0.000949 inches |

Note: nominal flexure preload is assumed to be three (3) grams.

Taking the data from Table 1 into consideration it must now also be considered that this variability in deflection under load must be compensated for in the forming process used to pre-form the load point tab. However, although thicker tabs require forming to less of an angle to compensate for loaded deflection, these same thicker tabs form with greater angles than do thinner tabs, all other things being equal. Thus it is very difficult for the manufacturer to ever find a forming process that is a happy compromise for both thick and thin load point tabs.

A third difficulty with the configuration of the incorporated references relates to non-operating shock. Typically, the concern with non-operating shock is in the problem of sliders lifting off the disc surface as a result of the disc drive receiving a sudden shock or jolt, and then impacting the disc surface upon its return to the loaded position. This usually happens if the shock is normal to the disc surface and if the acceleration magnitude is greater than the load force of the flexure divided by the mass of the slider plus that portion of the flexure near the load beam.

With the flexure configuration of the previously cited references, however, there is an additional concern when the shock is in a direction which encourages the slider toward the disc. Because the half-etched load point tab of the previously cited references has low out-of-plane stiffness, the mass near the distal end of the flexure will cause the load point tab to deflect during such shocks, and, if the magnitude of the shock is great enough, the load point tab will deflect enough to contact the upper surface of the slider body. This, in turn can result in a chip or particle breaking away from the slider body, potentially causing failure of the entire disc drive.

It can be shown that the critical shock level for this mode of failure is described by the following relationship:

$$\frac{(\text{Tongue Stiffness}) \cdot (\text{Tongue-Slider Clearance})}{\text{Load Beam Lumped Mass}}$$

For the example values used and described in the first of the previously cited references, nominal clearance between the slider and the load point tab is 0.0015 inches, and the lumped mass of that portion of the flexure near the slider is estimated at 0.015 grams. Using this information, critical shock levels for different load point tab thickness can be calculated from the above relationship, and these results are shown in Table 2.

TABLE 2

| Tab Thickness | Tab Stiffness | Critical Shock Level |
| --- | --- | --- |
| 0.0007 inches (−3σ) | 498 grams/inch | 50 G |
| 0.0008 inches (−2σ) | 743 grams/inch | 74 G |
| 0.0009 inches (−1σ) | 1059 grams/inch | 106 G |
| 0.0010 inches (nominal) | 1452 grams/inch | 145 G |
| 0.0011 inches (+1σ) | 1933 grams/inch | 193 G |
| 0.0012 inches (+2σ) | 2510 grams/inch | 251 G |
| 0.0013 inches (+3σ) | 3161 grams/inch | 316 G |

In disc drives of the current 2.5" and 1.8" sizes, shock levels below 100 G are considered to be unacceptable, which indicates the second reason for concern with the completely half-etched load point tabs of the previously cited references.

The flexure of the present invention provides a flexure of the type described in the previously cited references, without all of the deficiencies of load point tab design recited above.

Figure 7:
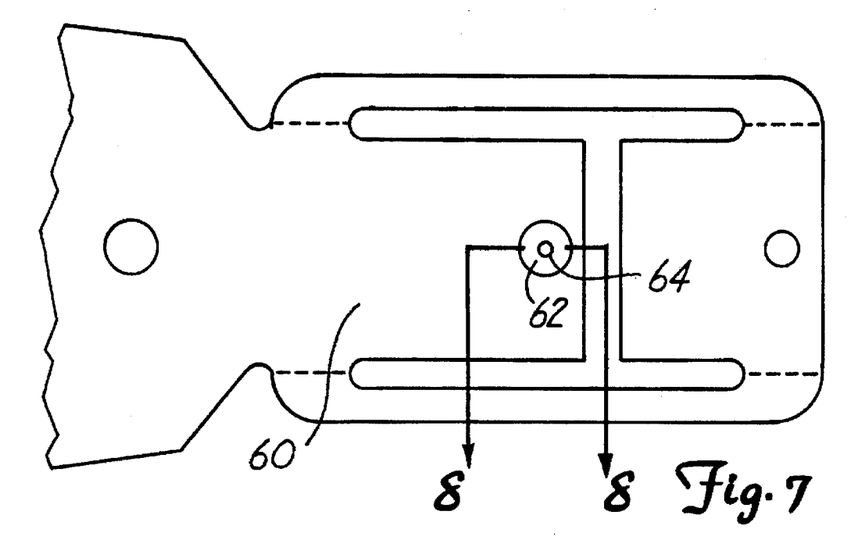
FIG. 7 is a bottom plan view of a flexure made in accordance with a first embodiment of the present invention.

Turning now to FIG. 7, shown is a detail plan view of the lower side of a flexure including a load point tab 60 which is a part of a first embodiment of the flexure of the present invention. As shown, the load point tab 60 includes a thinned area 62 local to and surrounding the desired location of the load point button 64. This thinned area 62 is formed using the process of half-etching, as described above, and, after the etching process is complete, the load point button 64 retains the full thickness of the flexure material.

Figure 8:
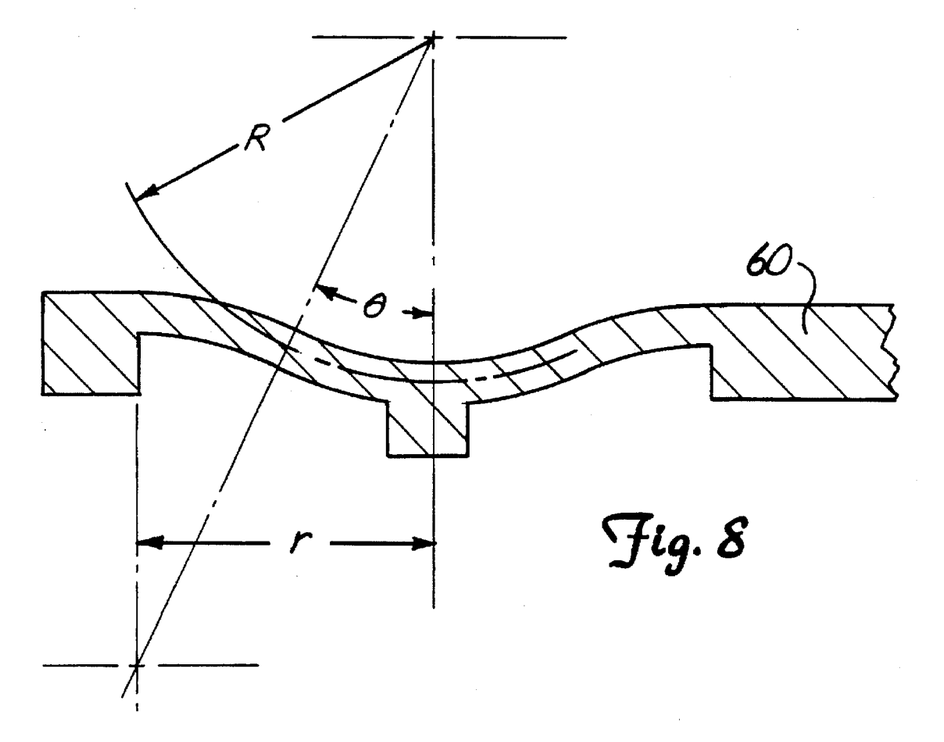
FIG. 8 is a detail sectional view of a portion of the gimbal portion of the load point tab of the flexure of FIG. 7.

The size of the thinned area 62 is selected such that the thinned area 62 is small enough to not bend under intended load forces exerted on the load point button 64. FIG. 8 shows a detail sectional view taken along line 8—8 of FIG. 7, and shows that the thinned area 62 is formed as a result of etching to displace the load point button 64 "out-of-plane" with the remainder of the load point tab 60. The amount of displacement is selected to be approximately one-half of the original material thickness. The specific factors used to determine the size of the thinned area 62, as well as the minimum bend radii which will not cause excess strain in the materials used are also illustrated in FIG. 8, and their desired relationship is defined by the formulae $$2R \sin\theta = r$$

$$2R\theta = 1.05\ r$$

$$2R(1 - \cos\theta) = dimple\ height = 0.0015"$$

where:
  θ = the angle through which the bending is performed, in radians
  R = the radius of the bend, measured to the material centerline, and
  r = the greatest extent of the thinned area, measured from the center of the load point button to the outer edge.

By applying these formulae, a thinned area which is unbendable under the intended load conditions and does not result in excessive material strain can be defined.

Furthermore, even though the forming of the thinned area 62 is a secondary manufacturing operation to the etching/half-etching process used to form the outline and features of the flexure, the precision of the location of the load point button 64 is not subject to tolerance variations in the forming process, unlike prior art formed dimples, since the location of the load point button 64 is purely a function of the easily controlled etching/half-etching process.

Figure 9:
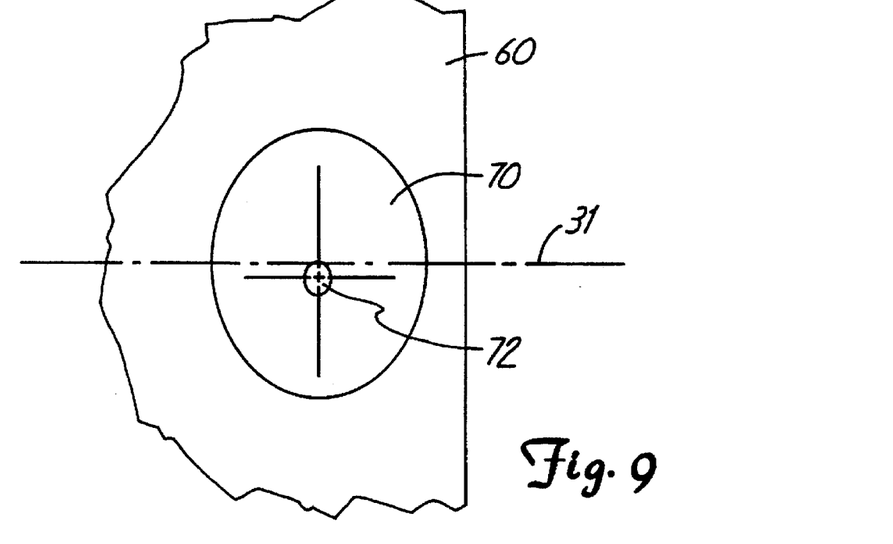
FIG. 9 is a bottom plan view of a first alternative embodiment of the present invention.

FIG. 9 shows a detail bottom plan view of a portion of a load point tab 60, illustrating a second possible embodiment of the present invention. In this embodiment, the thinned section 70 is oblong rather than circular as was shown in FIG. 7, and the load point button 72 is clearly shown to be offset from the centerline 31 of the flexure. This offset is intended to compensate for differences between the linear velocity of the spinning discs under the inner and outer air bearing surfaces of the slider, as was thoroughly explained in the application of which this application is a continuation-in-part. FIG. 9 also serves to illustrate that the specific shape of the thinned area 70 is not limiting to the scope of the present invention, so long as care is taken during the forming of the thinned area 70 to avoid undue straining of the material.

Figure 10:
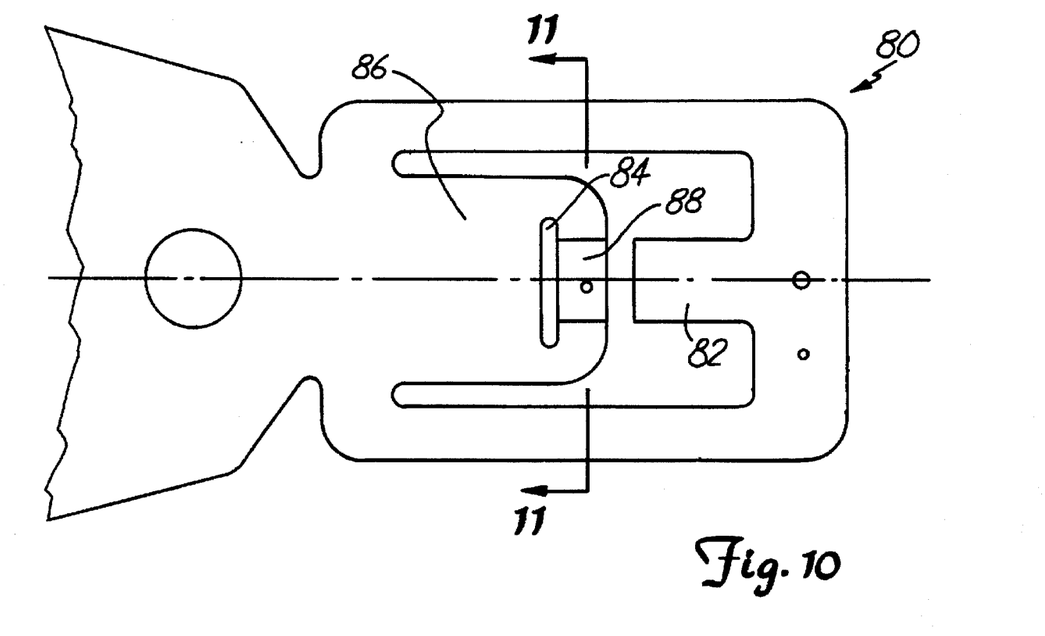
FIG. 10 is a bottom plan view of a second alternative, and presently preferred, embodiment of the present invention.

FIG. 10 shows a bottom plan view of a third and presently preferred embodiment 80 of the flexure of the present invention. Several differences between this embodiment and the embodiment of FIG. 7 are apparent. Firstly, the width of the load point tab 82 has been reduced, such that, when a slider (not shown) is attached, the outer lateral two-thirds of the slider will be accessible from the top. This will allow the attachment of conductive wires to head terminations on the top surface of the slider, as was described in detail in U.S. Pat. No. 5,331,489, previously incorporated herein by reference.

Secondly, a relief slot 84 has been through-etched through the load point tab 86, and the thinned area 88 is now of a rectangular shape. Once again it should be noted that the exact shape of the thinned area is not to be considered limiting to the scope of the present invention, so long as care is taken during the forming of the thinned area to avoid excessive strain on the material. The forming of the thinned area 88 of the preferred embodiment is illustrated in FIG. 11.

Figure 11:
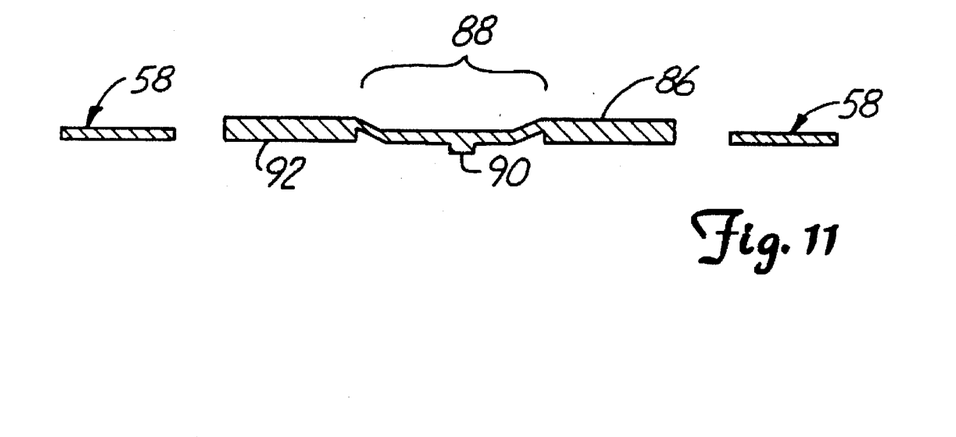
FIG. 11 is a sectional view of the flexure of FIG. 10.

FIG. 11 is a sectional elevation view of the flexure of FIG. 10 taken along the line labeled 11—11 in FIG. 10. In FIG. 11, the load point tab 86 can be seen to be of a first material thickness, while the thinned area 88 is of a second, lesser thickness. This thinning of the material is accomplished by half-etching area 88, as described hereinabove. The thinned area 88 is then displaced by a secondary manufacturing step out-of-plane from the remainder of the load point tab 86 in the direction toward the side of the flexure on which the slider (not shown) will be mounted. The amount of deflection applied to the thinned area is approximately one-half the original material thickness, which results in the load point button 90 being displaced from the lower surface of the load point tab 86 by approximately one-half the original material thickness as well. Such an arrangement places the point of contact between the load point button 90 and the top surface of the slider nearly in-plane with the gimbal beams 58. Once again, the size of the thinned area 88 has been selected to make the thinned area 88 substantially non-compliant under intended load forces. The overall effect of the present invention is illustrated in FIG. 12.

Figure 12:
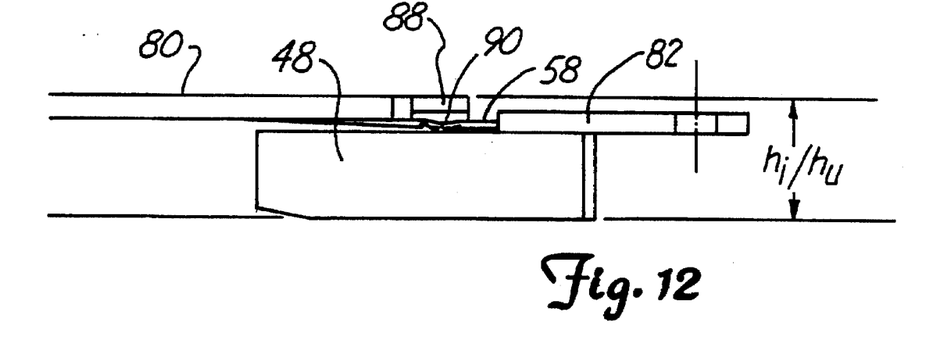
FIG. 12 is a side sectional view of the gimbal portion of the flexure of FIGS. 10 and 11 as assembled to a slider.

FIG. 12 is a sectional side elevation view of a flexure/slider assembly which includes the flexure of FIGS. 10 and 11. As shown, displacing the thinned area 88, with the load point button 90, approximately one-half the material thickness toward the slider 48, results in the slider mounting tab 82 being also displaced a similar vertical distance. This displacement is accommodated by the flexibility of the gimbal beams 58. It has been calculated that, since the majority of the load point tab of the present invention retains the full thickness of the original flexure material, the placing of a complete flexure/slider assembly under intended loading forces will result in a load point tab deflection of only 0.000132 inches, and a resultant tab slope of only 0.227 degrees. Therefore, the loaded height, $h'_1$, and unloaded height, $h'_u$, of the flexure/slider assembly of FIG. 12 are virtually identical. A comparison of FIG. 12 to FIGS. 5 and 6 will show that while the loaded height, $h'_1$, of the present invention is slightly greater than the loaded height, $h_1$, of the application of which this application is a continuation-in-part (as noted in FIG. 5), the unloaded height, $h'_u$, of the present invention is less than the unloaded height, $h_u$, of the previous application (as shown in FIG. 6). It should be recalled that it is the unloaded height of the flexure/slider assembly which is limiting to the interdisc spacing of the disc drive during assembly.

Figure 13:
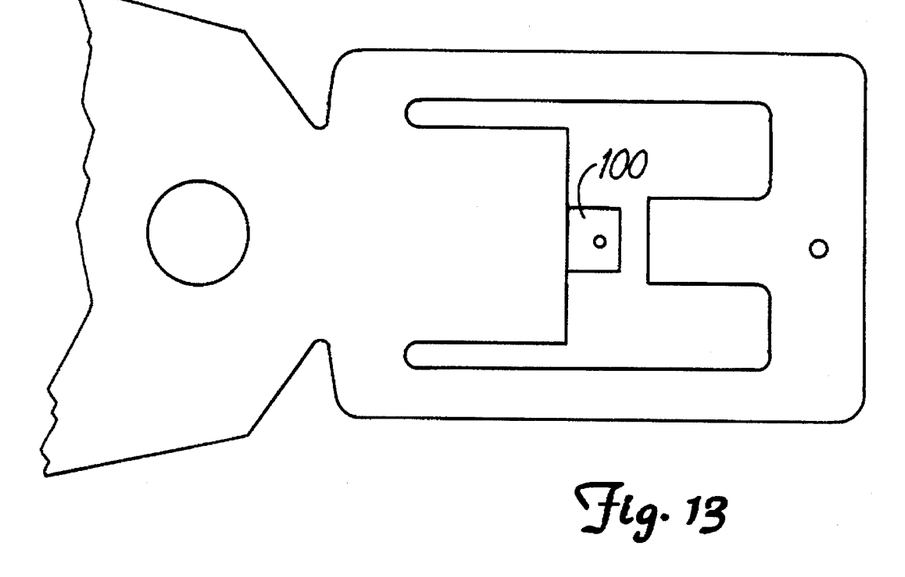
FIG. 13 is a bottom plan view of a third alternative embodiment of the present invention.

FIG. 13 shows a third possible embodiment of the flexure of the present invention. In this embodiment, the thinned area 100 is in the form of a "stubby tab" which is in turn cantilevered from the distal end of the load point tab. Again, the size of the tab would be selected to be substantially non-compliant under intended load forces, and the thinned area 100 would be formed out-of-plane from the remainder of the load point tab by approximately one-half the material thickness.

Figure 14:
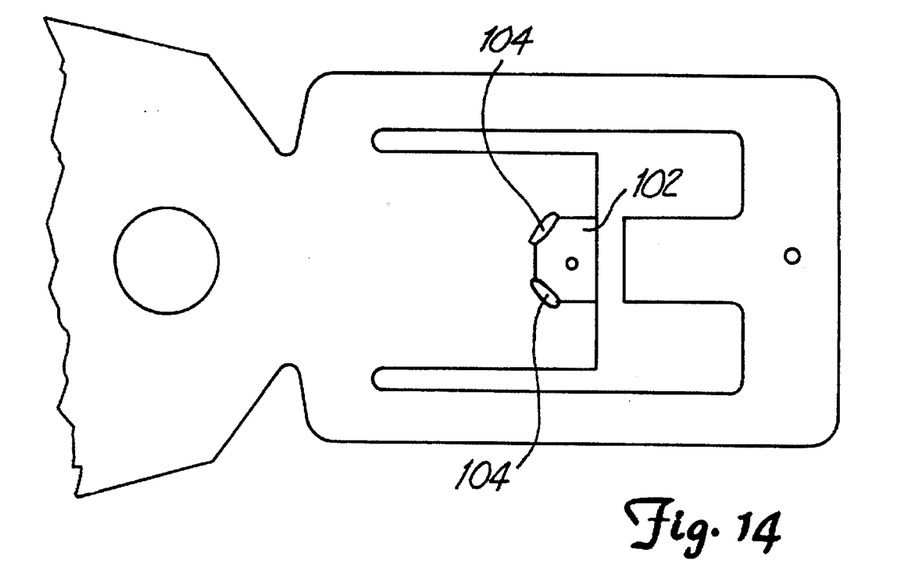
FIG. 14 is a bottom plan view of a fourth alternative embodiment of the present invention.

FIG. 14 shows a fourth possible embodiment of the flexure of the present invention. This embodiment is similar to the preferred embodiment of FIGS. 10 and 11, inasmuch as the thinned area is substantially rectangular in shape. In the embodiment of FIG. 14, however, there are two relief slots 104 included instead of the single relief slot of FIGS. 10 and 11.

From the foregoing, it will be apparent that any one of several modifications could be made to the embodiments illustrated by a person of skill in the art after reading this teaching. Therefore, the scope of the invention is to be limited only by the accompanying claims.

What is claimed is:

1. An elongated disc drive magnetic head mounting flexure with integral gimbal, the flexure formed from a single piece of planar material having a first material thickness and comprising:
    a load beam;
    a first tab of the integral gimbal extending from and substantially coplanar with said load beam, said first tab having a first portion and a second portion, said first tab retaining the first material thickness except in a thinned area of the first portion local to and surrounding a selected location of a load point button defined in the first portion, the load point button also retaining the first material thickness and the thinned area having a second material thickness less than said first material thickness,
        the load point button being positioned out-of-plane from said second portion of said first tab by an amount equal to substantially one-half of the first material thickness;
    a second tab of the integral gimbal, also integral with said load beam, longitudinally spaced from said first tab, the second tab providing a head mounting surface; and
    a pair of laterally disposed partially etched longitudinal beams of the integral gimbal connecting said first and second tabs.

2. A flexure as claimed in claim 1 wherein the thinned area is of a circular shape substantially centered on said load point button.

3. A flexure as claimed in claim 1 wherein the thinned area is of an oblong shape substantially centered on said load point button.

4. A flexure as claimed in claim 1 wherein the thinned area is of a substantially rectangular shape, the thinned area limited on a first side by a distal end of the first tab, and the thinned area limited on a second side opposite said first side by a relief slot.

5. A flexure as claimed in claim 1 wherein the thinned area comprises a third tab extensive from the first tab.

6. A flexure as claimed in claim 1 wherein the extent of the thinned area is limited at least in part by a plurality of relief slots.

7. A flexure for supporting a slider for magnetic recording, said flexure comprising:
    a rigid beam; and
    a gimbal section, the rigid beam and the gimbal section formed from a single piece of resilient planar material having a first material thickness, the gimbal section comprising:
    means for mounting the slider;
    a load transfer tab extensive from the rigid beam and disposed to transfer load force from the rigid beam to the slider;
        said load transfer tab having a first portion and a second portion, said load transfer tab retaining the first material thickness except in a thinned area of the first portion local to and surrounding a selected location of a load point button defined in the first portion, the load point button also retaining the first material thickness and the thinned area having a second material thickness less than said first material thickness,
            the load point button being positioned out-of-plane from said second portion of said load transfer tab by an amount equal to substantially one-half of the first material thickness; and
    gimbal beam means, interposed between and connecting the slider mounting means and the rigid beam, for allowing gimballing of the slider.

8. A flexure as claimed in claim 7 wherein the thinned area is of a circular shape substantially centered on said load point button.

9. A flexure as claimed in claim 7 wherein the thinned area is of an oblong shape substantially centered on said load point button.

10. A flexure as claimed in claim 7 wherein the thinned area is of a substantially rectangular shape, the thinned area limited on a first side by a distal end of the load transfer tab, and the thinned area limited on a second side opposite said first side by a relief slot.

11. A flexure as claimed in claim 7 wherein the thinned area comprises a second tab extensive from the load transfer tab.

12. A flexure as claimed in claim 7 wherein the extent of the thinned area is limited at least in part by a plurality of relief slots.

13. A flexure for supporting a slider for magnetic recording, said flexure comprising:

a rigid beam; and a gimbal section, the rigid beam and the gimbal section formed from a single piece of resilient planar material having a first material thickness, the gimbal section comprising:

a slider mounting tab;

a load transfer tab, extensive from the rigid beam, for transferring load force from the rigid beam to the slider;

said load transfer tab having a first portion and a second portion, said load transfer tab retaining the first material thickness except in a thinned area of the first portion local to and surrounding a selected location of a load point button defined in the first portion, the load point button also retaining the first material thickness and the thinned area having a second material thickness less than said first material thickness, the load point button being positioned out-of-plane from said second portion of said load transfer tab by an amount equal to substantially one-half of the first material thickness; and means, interposed between and connecting the slider mounting tab and the rigid beam, for allowing gimballing of the slider.

14. A flexure as claimed in claim 13 wherein the thinned area is of a circular shape substantially centered on said load point button.

15. A flexure as claimed in claim 13 wherein the thinned area is of an oblong shape substantially centered on said load point button.

16. A flexure as claimed in claim 13 wherein the thinned area is of a substantially rectangular shape, the thinned area limited on a first side by a distal end of the load transfer tab, and the thinned area limited on a second side opposite said first side by a relief slot.

17. A flexure as claimed in claim 13 wherein the thinned area comprises a third tab extensive from the load transfer tab.

18. A flexure as claimed in claim 13 wherein the extent of the thinned area is limited at least in part by a plurality of relief slots.

* * * * *